United States Patent
Yamazaki et al.

(10) Patent No.: US 12,244,027 B2
(45) Date of Patent: Mar. 4, 2025

(54) SEALING GASKET AND TUBULAR BATTERY INCORPORATING SEALING GASKET

(71) Applicant: FDK CORPORATION, Tokyo (JP)

(72) Inventors: Tatsuya Yamazaki, Tokyo (JP); Shigeyuki Kuniya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 651 days.

(21) Appl. No.: 17/374,993

(22) Filed: Jul. 14, 2021

(65) Prior Publication Data

US 2021/0344069 A1 Nov. 4, 2021

Related U.S. Application Data

(63) Continuation of application No. PCT/JP2019/050912, filed on Dec. 25, 2019.

(30) Foreign Application Priority Data

Jan. 25, 2019 (JP) .................. 2019-011488

(51) Int. Cl.
*H01M 50/171* (2021.01)
*H01M 6/02* (2006.01)
(Continued)

(52) U.S. Cl.
CPC ........... *H01M 50/171* (2021.01); *H01M 6/02* (2013.01); *H01M 50/152* (2021.01);
(Continued)

(58) Field of Classification Search
CPC ............ H01M 50/171; H01M 50/186; H01M 50/152; H01M 50/198; H01M 50/184; H01M 50/193; H01M 6/02
See application file for complete search history.

(56) References Cited

U.S. PATENT DOCUMENTS

2009/0197165 A1 8/2009 Wada et al.
2010/0248019 A1 9/2010 Matsuhisa et al.
(Continued)

FOREIGN PATENT DOCUMENTS

EP  0538039 A2  4/1993
EP  0966052 A1  12/1999
(Continued)

OTHER PUBLICATIONS

International Search Report (ISR) for Application No. PCT/JP2019/050912 dated Dec. 25, 2019.
(Continued)

*Primary Examiner* — Brian R Ohara
*Assistant Examiner* — Emily Elizabeth Freeman
(74) *Attorney, Agent, or Firm* — Isshiki & Partners; Joseph P. Farrar, Esq.

(57) ABSTRACT

A sealing gasket used in a tubular battery includes a disc-shaped partition portion; an outer peripheral portion provided to stand from a peripheral edge of the partition portion and held between an open end of a metal battery can and a dish-shaped metal sealing plate; and a plurality of stress buffer portions formed of annular grooves formed concentrically in the partition portion, wherein the tubular battery includes the metal battery can having a bottomed tubular shape and has the open end subjected to inward diameter reduction, a power generation element housed in the battery can, the dish-shaped metal sealing plate fitted and attached to the open end subjected to the inward diameter reduction, and the sealing gasket made of resin and held between the open end and the sealing plate.

3 Claims, 5 Drawing Sheets

(51) Int. Cl.
  *H01M 50/152* (2021.01)
  *H01M 50/184* (2021.01)
  *H01M 50/186* (2021.01)
  *H01M 50/193* (2021.01)
  *H01M 50/198* (2021.01)

(52) U.S. Cl.
  CPC ....... *H01M 50/184* (2021.01); *H01M 50/186* (2021.01); *H01M 50/193* (2021.01); *H01M 50/198* (2021.01)

(56) References Cited

U.S. PATENT DOCUMENTS

2016/0293916 A1* 10/2016 Yamazaki ........... H01M 50/107
2017/0062778 A1    3/2017 Mille et al.

FOREIGN PATENT DOCUMENTS

| JP | H11-283588 | A | 10/1999 |
| JP | 2002-190285 | A | 7/2002 |
| JP | 2003-217532 | A | 7/2003 |
| JP | 2007-048730 | A | 2/2007 |
| JP | 2013-069459 | A | 4/2013 |
| JP | 2018-525793 | A | 9/2018 |
| WO | 2007-010669 | A1 | 1/2007 |

OTHER PUBLICATIONS

English Translation of the ISR for Application No. PCT/JP2019/050912 dated Dec. 25, 2019.
Written Opinion of the International Search Authority for Application No. PCT/JP2019/050912 dated Dec. 25, 2019.
Partial translation of Written Opinion of the International Search Authority for Application No. PCT/JP2019/050912 dated Dec. 25, 2019.
"How an Alkaline Battery Is Manufactured", retrieved online Dec. 26, 2018 at www.fdk.co.jp/denchi_club/denchi_story/arukari.
Extended European Search Report (EESR) for corresponding European Application No. 19912042.9 dated Feb. 27, 2023.
Chinese Office Action for Application No. 201980088968.5 issued on Sep. 28, 2023.
English translation of Chinese Office Action for Application No. 201980088968.5 issued on Sep. 28, 2023.
Chinese Office Action for Application No. 201980088968.5 issued Apr. 17, 2024.
English translation of the Chinese Office Action for Application No. 201980088968.5 issued Apr. 17, 2024.
Chinese Office Action for Application No. 201980088968.5 issued Feb. 8, 2024.
English translation of the Chinese Office Action for Application No. 201980088968.5 issued Feb. 8, 2024.
Chinese Decision of Rejection for Application No. 201980088968.5 issued Aug. 5, 2024.
English translation of the Chinese Decision of Rejection for Application No. 201980088968.5 issued Aug. 5, 2024.

* cited by examiner

SEALING GASKET AND TUBULAR BATTERY INCORPORATING SEALING GASKET

CROSS-REFERENCE TO RELATED APPLICATIONS

This is a continuation application of International Patent Application No. PCT/JP2019/050912 filed Dec. 25, 2019, which claims the benefit of priority to Japanese Patent Application No. 2019-011488 filed Jan. 25, 2019, the entire contents of each of which are hereby incorporated herein by reference.

BACKGROUND

Technical Field

The present disclosure relates to a sealing gasket and a tubular battery incorporating the sealing gasket.

Description of the Related Art

A general LR6 alkaline battery is given as an example of a tubular battery including a sealing gasket. FIG. 1 illustrates an internal structure of an alkaline battery 1. FIG. 1 illustrates a vertical cross section of the alkaline battery 1 oriented such that the cylinder axis 100 extends in an up-down (vertical) direction. As illustrated in FIG. 1, the alkaline battery 1 includes a bottomed tubular battery can 2 made of metal, a positive electrode mixture 3 shaped into a cylinder, a bottomed cylindrical separator 4 arranged on the inside of the positive electrode mixture 3, a negative electrode gel 5 containing a zinc alloy and filling the inside of the separator 4, a negative electrode current collector 6 in the form of a metal rod inserted into the negative electrode gel 5, a dish-shaped negative electrode terminal plate 7 made of metal, a sealing gasket 120 made of resin, a positive electrode terminal 8 formed on a bottom surface of the battery can 2, a beading portion 9 formed on the upper end side of the battery can 2, and exhaust holes 10.

In this structure, the positive electrode mixture 3, the separator 4, and the negative electrode gel 5 form a power generation element of the alkaline battery 1 in the presence of an electrolyte. Note that, in the following description, the up-down direction is defined such that the bottom portion side of the battery can 2 is the lower side for the sake of description. Moreover, the direction that is orthogonal to the up-down direction and extends outward is defined as the radial direction. These two directions indicate the relative directional relationship determined for the sake of convenience.

The battery can 2 is in direct contact with the positive electrode mixture 3 and thereby functions as a battery case and a positive electrode current collector. The dish-shaped negative electrode terminal plate 7 has a flanged edge and is fitted and attached to an open end of the battery can 2 via the sealing gasket 120 with the dish facing down, assuming that the positive electrode terminal 8 is on the lower side.

An upper end of the rod-shaped negative electrode current collector 6 inserted in the negative electrode gel 5 is welded to a lower surface of the dish-shaped negative electrode terminal plate 7. Note that the negative electrode terminal plate 7 is a sealing plate for closing the opening of the battery can 2. The negative electrode terminal plate 7, the negative electrode current collector 6, and the sealing gasket 120 are integrally combined in advance into a sealing unit.

Then, the sealing unit is inserted in the battery can 2, the open end of the battery can 2 is subjected to inward diameter reduction processing to fix the sealing gasket 120 in place by crimping. Specifically, the sealing gasket 120 is held between an inner surface of the battery can 2 and an edge of the negative electrode terminal plate 7 to put the battery can 2 into a sealed state.

FIG. 2 is a view illustrating the structure of the sealing gasket 120. FIG. 2 illustrates, in a vertical cross-sectional view, the shape of the sealing gasket 120 before it is fixed by crimping to the open end of the battery can 2. The sealing gasket 120 has a cup shape including a wall surface (hereinafter, sometimes referred to as an outer peripheral portion 24) provided to stand upright from the periphery of the disc. The center of the disc is a cylindrical boss portion 21 including a hollow portion (hereinafter, sometimes referred to as a boss hole 22) into which the negative electrode current collector 6 is to be press fitted. Then, when the sealing gasket 120 is incorporated into the battery can 2, a film-shaped portion (hereinafter, referred to a partition portion 23) extending from an outer periphery of the boss portion 21 to a peripheral edge of the disc seals a housing space for the power generation element in the battery can 2 and an interior of the battery can 2 is divided into upper and lower portions.

As a procedure of sealing the battery can 2, first the negative electrode terminal plate 7, the negative electrode current collector 6, and the sealing gasket 120 are integrally combined in advance into the sealing unit. Next, the sealing gasket 120 is arranged in the battery can 2 such that the sealing gasket 120 is seated on the beading portion 9 formed on the upper end side of the battery can 2, and the opening of the battery can 2 is covered with the sealing unit including the sealing gasket 120, the negative electrode terminal plate 7, and the negative electrode current collector 6. Then, the open end of the battery can 2 is crimped to seal the battery can 2.

A groove in the shape of a circle concentric with the outer peripheral portion 24 is formed in the partition portion 23 of the sealing gasket 120. For example, a groove-shaped thin portion 25 is formed in part of a back surface of the partition portion 23. The thin portion 25 functions as an explosion-proof safety mechanism that breaks first when the pressure in the battery can 2 increases abnormally and that eventually allows gas in the battery can 2 responsible for the abnormally-increased inner pressure to be released to the atmosphere via the exhaust holes 10 (see FIG. 1) provided in the negative electrode terminal plate 7.

Moreover, the partition portion 23 of the sealing gasket 120 is provided with a stress buffer portion 130 that absorbs stress in the inward radial direction exerted on the sealing gasket 120 when the open end of the battery can 2 is crimped to seal the battery can 2. The stress buffer portion 130 has a shape in which part of the partition portion 23 is bent in vertical cross-sectional view. The stress buffer portion 130 has a function of causing the disc shape of the partition portion 23 to uniformly deform, thereby suppressing unintentional breakage of the thin portion 25 due to stress imbalance when the stress in the inward radial direction is exerted on the partition portion 23.

The stress buffer function of the stress buffer portion 130 is provided by the vertical cross-sectional shape of the partition portion 23 in the sealing gasket 120. In the sealing gasket 120 illustrated in FIG. 2, there is formed the stress buffer portion 130, which is bent downward to have a U-shaped vertical cross section, in the partition portion 23 between the outer peripheral portion 24 and the boss portion 21. When the open end of the battery can 2 is crimped and the sealing gasket 120 is fixed in place, the stress buffer portion 130 deforms such that an opening of the U-shape in the vertical cross section closes, and thereby absorbs stress exerted on the partition portion 23 in the diameter reducing direction.

FIG. 3 is a vertical cross-sectional view of a sealing gasket 220 including a stress buffer portion 230 with a different shape from that in FIG. 2. In the sealing gasket 220 illustrated in FIG. 3, a portion extending obliquely upward from an inner periphery toward an outer periphery of the partition portion 23 and then bent obliquely downward to reach the outer peripheral portion 24 is the stress buffer portion 230. The stress buffer portion 230 absorbs stress exerted on the partition portion 23 by changing the angles (01, 02) of the bent portions on the upper surface side and the lower surface side of the partition portion 23 when the battery can 2 is sealed. The structure of the sealing gasket 220 including the aforementioned stress buffer portion 230 is described in detail in Japanese Patent Application Publication No. 2013-69459. Moreover, a method of manufacturing the alkaline battery 1 is described at FDK Corporation's "How an Alkaline Battery Is Manufactured", retrieved online on Dec. 26, 2018 at www.fdk.co.jp/denchi_club/denchi_story/arukari.

Technical Problem

In each of the sealing gaskets (120, 220) illustrated in FIGS. 2 and 3, the shape of the stress buffer portion (130, 230) is optimized and, when the open end of the battery can 2 is crimped and the sealing plate seals the battery can 2, the stress buffer portion (130, 230) deforms and reliably prevents deformation of the sealing gasket (120, 220) and breakage of the thin portion 25.

However, the stress buffer portion (130, 230) is bent to greatly protrude downward in the partition portion 23 to make it easy to deform when the battery can 2 is sealed. Accordingly, with the sealing gasket (120, 220) configured as described above, it is difficult to increase the capacity of the power generation element housing region situated below the lower surface of the partition portion 23 of the sealing gasket (120, 220) in the battery can 2 for housing the power generation element (positive electrode mixture 3, separator 4, negative electrode gel 5, and electrolyte). Specifically, the sealing gasket (120, 220) configured as described above limits the volume of the power generation element that can be packed in the battery can 2, and thus it is difficult to improve the discharge performance.

The present disclosure provides a sealing gasket that reliably absorbs stress generated when an opening portion of a battery can of a tubular battery is sealed by diameter reduction processing and that also allows an increase in the volume of a power generation element packed in the battery can, and a tubular battery including the sealing gasket.

SUMMARY

An aspect of the present disclosure to achieve the above objective is a sealing gasket used in a tubular battery, the sealing gasket including a disc-shaped partition portion; an outer peripheral portion provided to stand from a peripheral edge of the partition portion and held between an open end of a metal battery can and a dish-shaped metal sealing plate; and a plurality of stress buffer portions formed of annular grooves formed concentrically in the partition portion. The tubular battery includes the metal battery can having a bottomed tubular shape and has the open end subjected to inward diameter reduction, a power generation element housed in the battery can, the dish-shaped metal sealing plate fitted and attached to the open end subjected to the inward diameter reduction, and the sealing gasket made of resin and held between the open end and the sealing plate. Ha/H, which is a ratio of a thickness Ha of a region of the partition portion in which the plurality of stress buffer portions are formed to an overall height H, is 15% or more and 30% or less.

DETAILED DESCRIPTION

Figure 1:
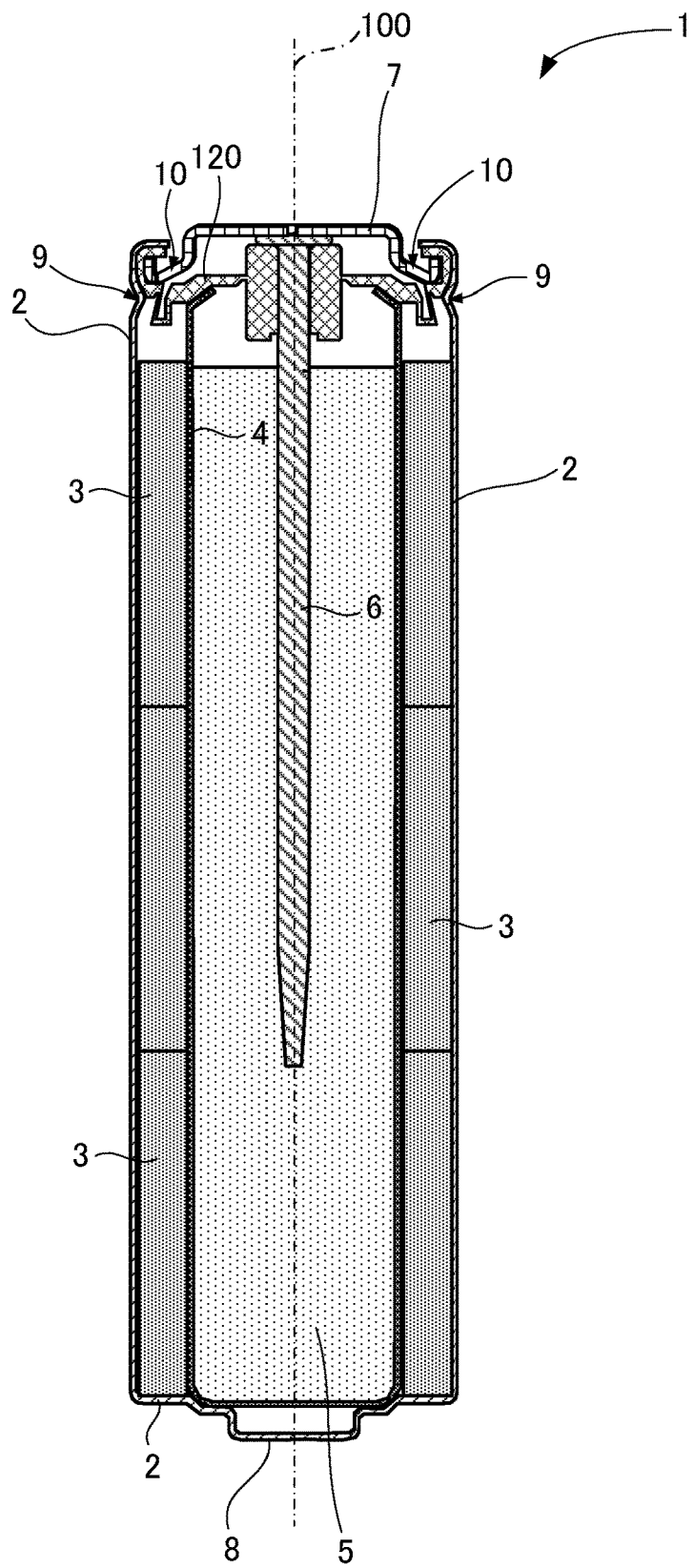
FIG. 1 is a view illustrating the structure of an alkaline battery.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a sealing gasket and a tubular battery according to embodiments of the present disclosure are described. As used herein, the singular forms "a", "an", and "the" are intended to include the plural forms as well, unless the context clearly indicates otherwise.

An embodiment of the present disclosure is described below with reference to the attached drawings. Note that, in the drawings used in the following description, in some cases the same or similar parts are denoted by the same reference signs and repetitive description thereof is omitted.

EMBODIMENTS

A sealing gasket according to the embodiment of the present disclosure is described based on a sealing gasket used in an LR6 alkaline battery. FIG. 4 illustrates the structure of a sealing gasket 20 according to the example. FIG. 4 is a vertical cross-sectional view of the sealing gasket 20. Note that the stress buffer portion (130, 230) is formed in one portion of the partition portion 23 in each of the aforementioned sealing gaskets illustrated in FIGS. 2 and 3 (hereinafter, a sealing gasket 120 according to a comparative example 1 and a sealing gasket 220 according to a comparative example 2). In contrast, according to the embodiment as illustrated in FIG. 4, stress buffer portions (30a, 30b) are formed in multiple portions of the partition portion 23 in the sealing gasket 20 (in this case, two portions).

Specifically, the sealing gasket 20 according to the present embodiment is fabricated by injection molding using a resin such as nylon 6 or 12. The stress buffer portions (30a, 30b) formed in annular groove shapes concentric with a boss portion 21 are formed on the upper surface side and the lower surface side of the partition portion 23, respectively. Moreover, the two stress buffer portions (30a, 30b) are formed adjacent to each other with one side wall in between, in the radial direction of the partition portion 23.

In the sealing gasket 20 according to the example, as illustrated in FIG. 4, the thickness Ha of the region of the partition portion 23 in which the stress buffer portions (30a, 30b) are formed is set as appropriate, increasing the internal capacity of the tubular alkaline battery 1 including the sealing gasket 20 for housing the power generation element for improved discharge capacity, as well as ensuring that, when the pressure inside the battery can 2 reaches a certain pressure, a thin portion 25 serving as a safety valve will break to ensure safety.

Figure 5:
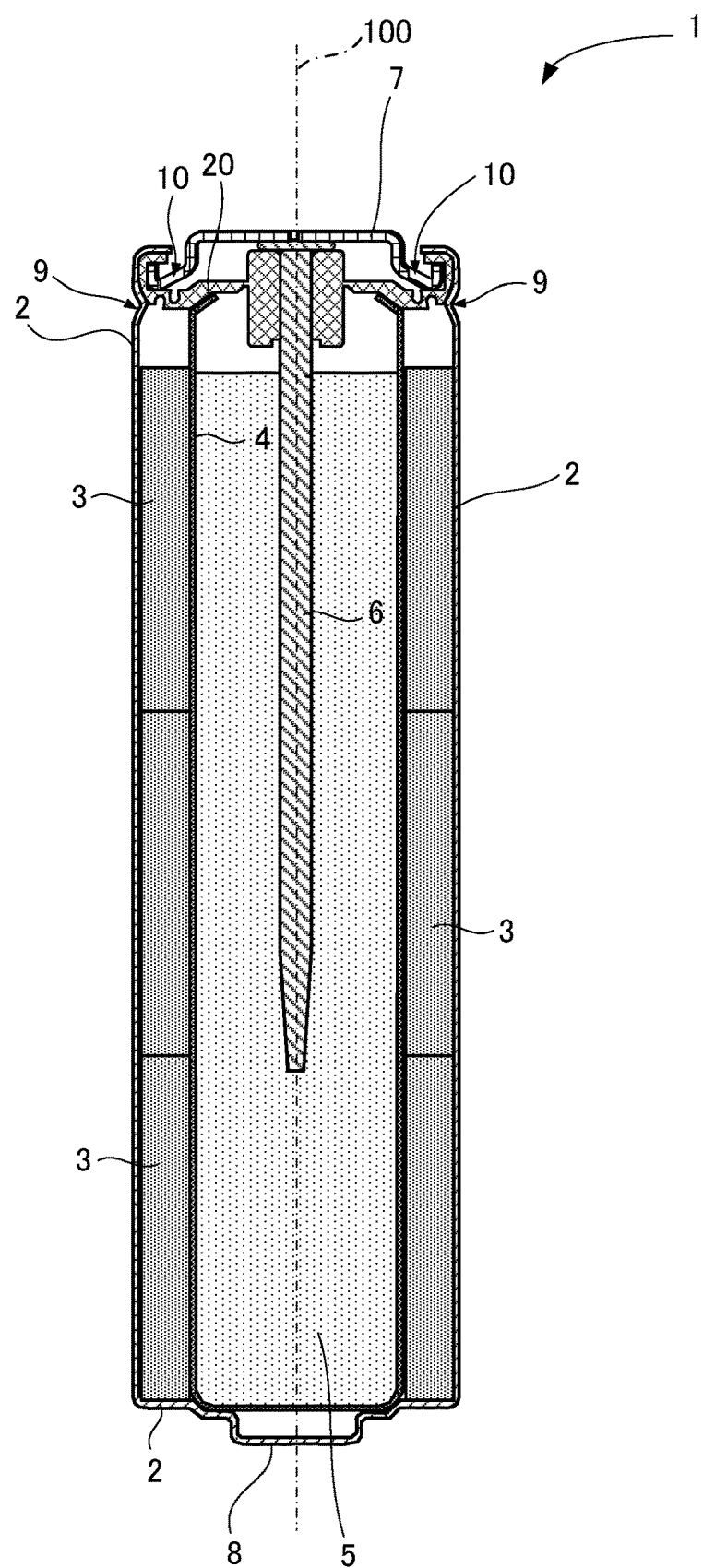
FIG. 5 is a view illustrating an alkaline battery including the sealing gasket according to the aforementioned embodiment.

FIG. 5 illustrates a vertical cross-sectional view of the LR6 alkaline battery 1 including the sealing gasket 20 according to the example. As illustrated in FIG. 5, when the sealing gasket 20 according to the example is crimped to the open end of the battery can 2 via the negative electrode terminal plate 7, the sealing gasket 20 deforms such that openings of grooves forming the respective two stress buffer portions (30a, 30b) are closed (in other words, the width of the grooves becomes smaller), and absorbs stress exerted on the partition portion 23 in the diameter reducing direction (radially inward radiation direction or radial direction). This suppresses deformation in the region inside the stress buffer portions (30a, 30b) of the partition portion 23 and can prevent breakage of the thin portion 25 formed around the boss portion 21.

Performance Evaluation

Figure 6:
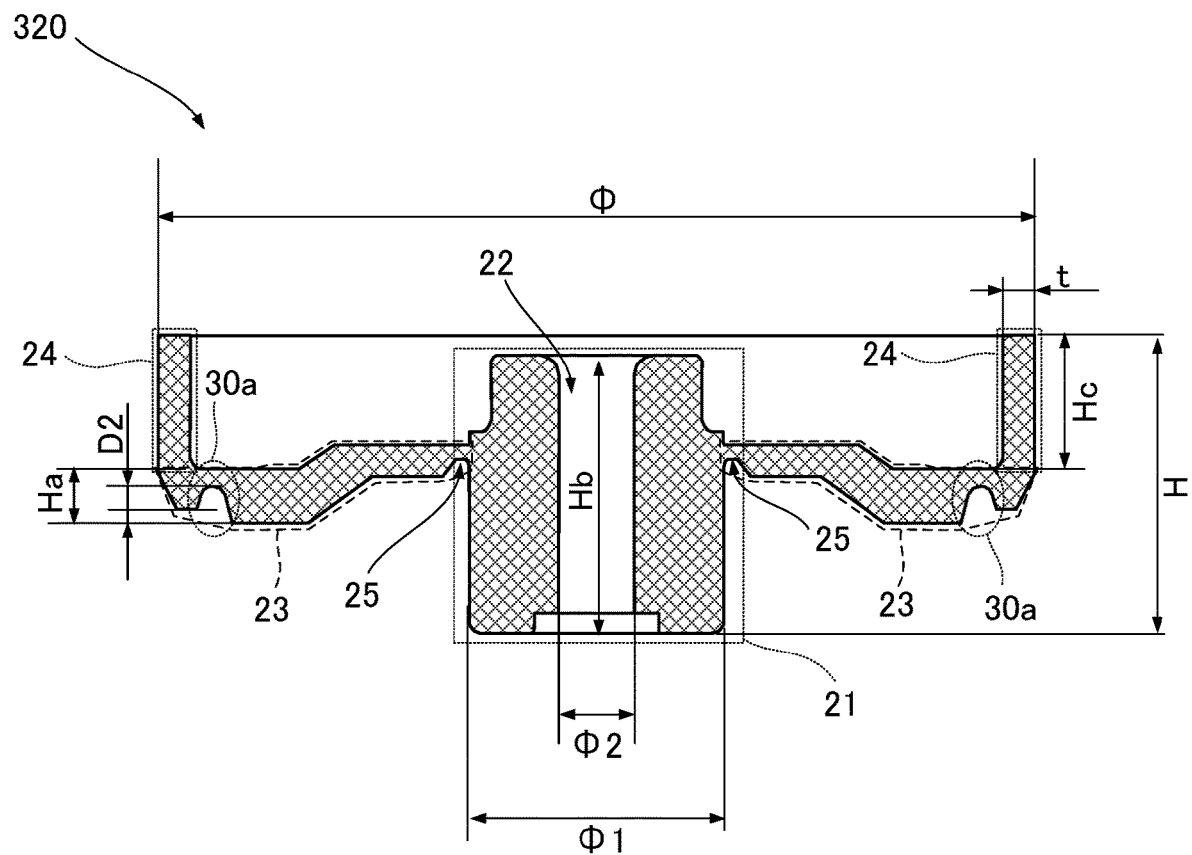
FIG. 6 is a view illustrating a sealing gasket according to a comparative example.

Next, in order to evaluate the performance of the sealing gasket 20 according to the example, there were fabricated the sealing gasket 120 according to the comparative example 1 illustrated in FIG. 2, the sealing gasket 220 according to the comparative example 2 illustrated in FIG. 3, and various sealing gaskets (hereinafter, referred to as gaskets 20 according to the embodiment in some cases) varying in the thickness Ha of the stress buffer portions (30a, 30b) in the sealing gasket 20 according to the example illustrated in FIG. 4. Moreover, as illustrated in FIG. 6, there were fabricated sealing gaskets 320 according to a comparative example 3 that each include only one stress buffer portion 30a out of the two stress buffer portions (30a, 30b), in contrast to the gaskets 20 according to the example.

Note that, in FIGS. 2 to 4 and 6, the sizes of portions corresponding to one another in the sealing gaskets (120, 220, 20, 320) illustrated in the respective drawings are denoted by the same reference signs. The various types of fabricated sealing gaskets (120, 220, 20, 320) were made of the same resin material and had the same overall height H and the same outer diameter φ. Moreover, the sizes of portions other than the stress buffer portions (130, 230, 30a, 30b), for example, the boss portion (height Hb, outer diameter φ1, inner diameter φ2), the outer peripheral portion (height Hc, thickness t), and the like were the same.

Among the gaskets 20 according to the example, the sizes of the corresponding portions were the same except for the thickness of the stress buffer portions (30a, 30b) (hereinafter, also referred to as buffer portion height Ha). Moreover, the depths of the grooves of the two annular groove-shaped stress buffer portions (30a, 30b) in the gaskets 20 according to the example depended on the buffer portion height Ha and were adjusted such that the portions corresponding to the bottoms of the grooves had the same thickness. Accordingly, in the case where the buffer portion height Ha was small, the depth was small. The setting in which the portions corresponding to the bottoms of the grooves have the same thickness allows these portions to exhibit the same degree of buffer performance when the gasket 20 is fixed to the open end of the battery can 2 by crimping and is deformed.

The thickness of the thinnest portion in the region in which the stress buffer portions (30a, 30b) were formed was equal to or greater than the thickness of the thin portion 25 that functions as the safety valve. Note that the thickness of the thin portion 25 in each type of fabricated sealing gasket (120, 220, 20, 320) was set based on mechanical properties (tensile strength, compressive strength, bending strength, and the like) of the material (nylon 6 or 12 or the like) forming the sealing gasket (120, 220, 20, 320) such that the thin portion 25 breaks in a predetermined pressure range.

Moreover, the overall height H, the height Hb of the boss portion 21, the height Hc of the outer peripheral portion 24, the diameter φ, the outer diameter φ1 of the boss portion 21, the inner diameter φ2 of the boss portion 21, and the thickness t of the outer peripheral portion 24 were the same for all the various types of fabricated sealing gaskets (120, 220, 20, 320).

To evaluate characteristics of the aforementioned various types of sealing gaskets (120, 220, 20, 320), there were fabricated samples in which the LR6 battery cans 2 were sealed with various types of sealing units including these sealing gaskets (120, 220, 20, 320). Then, for each of the samples, the capacity of the housing region for the power generation element (hereinafter, referred to as simply capacity in some cases) was investigated, and an operation test of the safety valve (thin portion 25) and a high temperature storage test were performed. Note that the operation test of the safety valve was performed using samples that did not house a power generation element in the battery cans 2 whereas the high temperature storage test was performed using samples that housed a power generation element in the battery cans 2.

Moreover, the operation test of the safety valve (thin portion 25) and the high temperature storage test were performed for each sample by using 20 individual sample specimens.

In the operation test of the safety valve (thin portion 25), samples of the battery cans 2 that had been sealed without housing a power generation element were used. Then, compressed air was introduced into the housing region for a power generation element in each sample, and the pressure at which the safety valve operated was investigated. Then, if the pressure at which the safety valve broke was within a predetermined numerical range for 20 individual specimens belonging to the same sample, it was determined that this sample passed the test. If there were one or more individual specimens whose safety valve broke outside the numerical range among all individual specimens, it was determined that this sample failed the test.

The high temperature storage test was performed to evaluate a long-term storage performance of the alkaline battery 1. In this test, samples that housed a power generation element in the battery cans 2 were stored for 30 days at a temperature of 90° C. and whether liquid had leaked or not was visually checked. If there were one or more individual specimens exhibiting liquid leakage among the 20 individual specimens, it was determined that this sample failed the test.

Test results for each of the samples are illustrated in the following Table 1.

TABLE 1

| Sample | Sealing gasket (structure) | Stress buffer portion (number of portions) | Ha/H (%) | Capacity | Safety valve operation test | High temperature storage test |
|---|---|---|---|---|---|---|
| 1 | Comparative example 1 | — | 42 | — | Passed | Passed |
| 2 | Comparative example 2 | — | 40 | — | Passed | Passed |
| 3 | Comparative example 3 | 1 | 10 | Passed | Failed | Failed |
| 4 | Comparative example 3 | 1 | 20 | Passed | Failed | Failed |
| 5 | Comparative example 3 | 1 | 30 | Passed | Failed | Failed |
| 6 | Embodiment | 2 | 10 | Passed | Failed | Failed |
| 7 | Embodiment | 2 | 15 | Passed | Passed | Passed |
| 8 | Embodiment | 2 | 20 | Passed | Passed | Passed |
| 9 | Embodiment | 2 | 30 | Passed | Passed | Passed |
| 10 | Embodiment | 2 | 40 | Failed | Passed | Passed |

Figure 2:
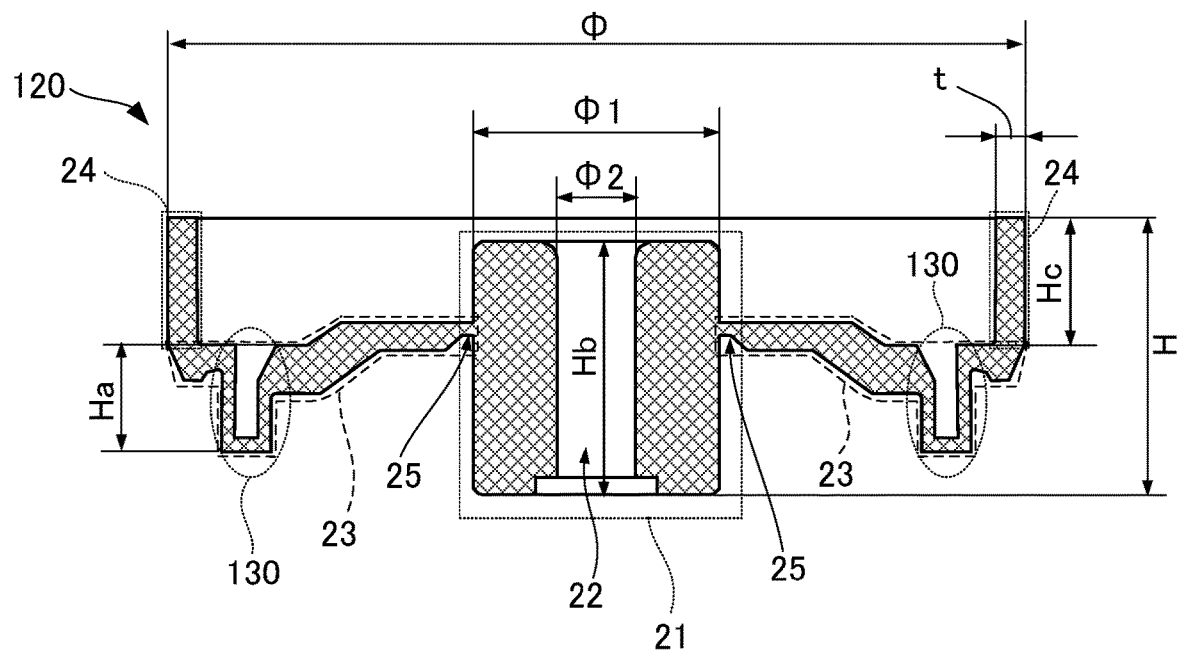
FIG. 2 is a view illustrating an example of a sealing gasket configured to be incorporated in the alkaline battery.
Figure 3:
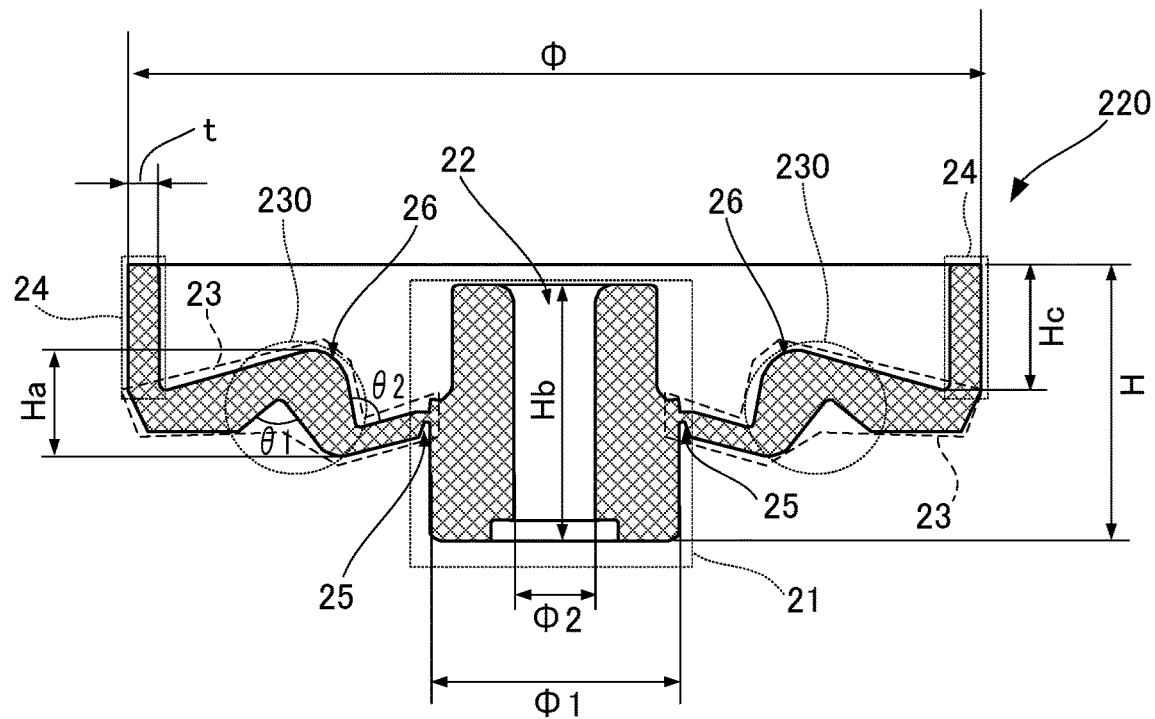
FIG. 3 is a view illustrating another example of a sealing gasket configured to be incorporated in the alkaline battery.
Figure 4:
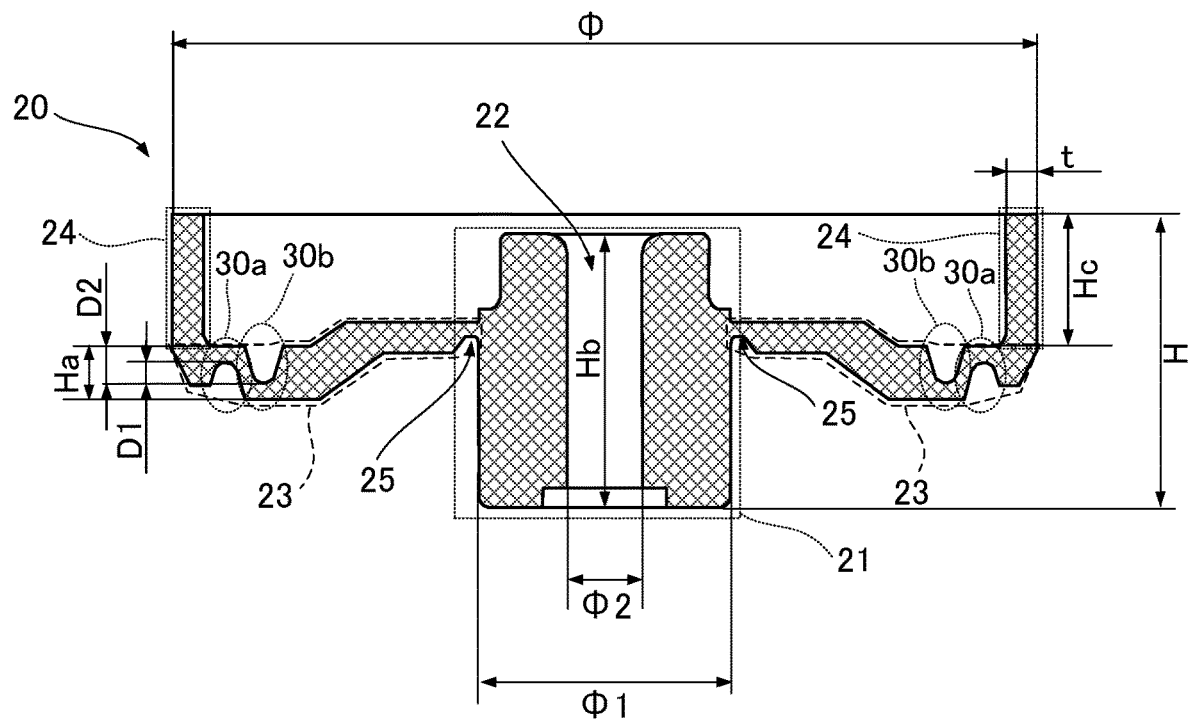
FIG. 4 is a view illustrating a sealing gasket according to an embodiment of the present disclosure.

In Table 1, the sample 1 is the alkaline battery 1 including the sealing gasket 120 according to the comparative example 1 illustrated in FIG. 2 and the sample 2 is the alkaline battery 1 including the sealing gasket 220 according to the comparative example 2 illustrated in FIG. 3. The samples 3 to 5 are each the alkaline battery 1 including the sealing gasket 320 according to the comparative example 3 illustrated in FIG. 6. Then, the samples 6 to 10 are each the alkaline battery 1 including the gasket 20 according to the example having a structure the same as or similar to that illustrated in FIG. 4.

Moreover, as illustrated in FIGS. 2 to 4 and 6, "Ha/H" in Table 1 is the ratio Ha/H of the thickness Ha of the region in which the stress buffer portions (130, 230, 30a, 30b) were formed to the overall height H in each of the sealing gaskets (120, 220, 20, 320), expressed as a percentage (%). The greater the value of Ha/H is, the smaller the capacity of the housing region for the power generation element is.

In Table 1, the samples 1 and 2 are both LR6 alkaline batteries 1 commercially provided as products and have substantially the same capacity. The ratios Ha/H of the samples 1 and 2 were 42% and 40%, respectively. As a matter of course, the safety valves in the samples 1 and 2 operated at specified pressures and the samples 1 and 2 also passed a high temperature storage test. Specifically, appropriate values of Ha/H in the sealing gaskets (120, 220) according to the comparative examples 1 and 2 are 42% and 40%, respectively, and, in the case where the ratios Ha/H are greater than the respective appropriate values, the capacity decreases and it is difficult to provide satisfactory discharge performance. In the case where the ratios Ha/H are smaller than the respective appropriate values, it is difficult for the stress buffer portion (130, 230) to sufficiently absorb the stress when the battery can 2 is sealed, and the partition portion 23 tends to deform. Accordingly, the pressure at which the safety valve operates may be out of specification. Moreover, if the sealing gasket falls into a state where excessive stress is constantly exerted on the partition portion 23 due to the stress in sealing the battery can 2, there is also a possibility that part of the thin portion 25 to serve as the safety valve may deteriorate more quickly than the other portions in the high temperature storage test, causing liquid leakage due to cracking of the thin portion 25.

In each of the samples 3 to 5 including the sealing gasket 320 according to the comparative example 3 illustrated in FIG. 6, the stress buffer portion (30a) of the sealing gasket (320) is formed within the range of the thickness of the partition portion 23, and thus it is easy to increase the capacity of the power generation element housing region. In the case where Ha/H≤30%, the capacity of the power generation element housing region can be greater than those in the samples 1 and 2. In each of the samples 3 to 5 including the sealing gasket 320 according to the comparative example 3, there were one or more individual specimens whose safety valve (thin portion 25) broke at a pressure out of the specification and one or more individual specimens that exhibited liquid leakage in the high temperature storage test. The reason for this is assumed to be that the sealing gasket 320 according to the comparative example 3 includes only one stress buffer portion 30a and was unable to sufficiently absorb the stress in sealing the battery can 2.

In each of the samples 6 to 10 including the sealing gasket 20 according to the example, the stress buffer portions (30a, 30b) of the sealing gasket 20 are formed within the range of the thickness of the partition portion 23 as in the comparative example 3, and thus it is easy to increase the capacity of the power generation element housing region. In the case where Ha/H≤30%, the capacity of the power generation element housing region can be greater than those in the samples 1 and 2. However, in the sample 10 in which Ha/H=40%, the power generation element housing region was unable to have a greater capacity than those in the samples 1 and 2. In the samples 7 to 9 in which 15%≤Ha/H≤30% among the samples 6 to 9 which included the gasket 20 according to the embodiment and in which the capacity of the power generation element housing region was greater than those in the samples 1 and 2, the safety valve (thin portion 25) broke at a pressure within the specification in all individual specimens and there was no individual piece in which liquid leakage due to cracking of the safety valve occurred in the high temperature storage test. Note that, in the sample 6 in which Ha/H=10%, the pressure at which the safety valve worked was out of the specification and liquid leakage occurred in the high temperature storage test. The reason for this is assumed to be that since in the sample 6, the thickness of the region of the sealing gasket 20 in which the stress buffer portions (30a, 30b) are formed is small, the partition portion 23 deformed greatly in this region by a slight change in stress.

The sealing gasket 20 according to the embodiment is thus configured such that the multiple annular groove-shaped stress buffer portions (30a, 30b) concentric with the boss portion 21 are formed in part of the disc-shaped partition portion 23 and the ratio Ha/H of the maximum thickness Ha of the region in which the stress buffer portions (30a, 30b) are formed to the overall height H is 15% or more and 30% or less.

OTHER EMBODIMENTS

Although the two stress buffer portions (30a, 30b) adjacent to each other in the radial direction are offset from each other on the upper surface (one surface) and the lower surface (the other surface), respectively, of the partition portion 23 in the sealing gasket 20 according to the aforementioned embodiment, alternatively both of the stress buffer portions (30a, 30b) may be formed on one of the upper surface and the lower surface of the partition portion 23.

Further alternatively, although the sealing gasket 20 according to the aforementioned embodiment includes two stress buffer portions (30a, 30b), the sealing gasket may include three or more stress buffer portions. Note that, if the partition portion 23 with a limited projected area in the up-down direction is provided with many stress buffer portions (30a, 30b), the width of a groove forming each of the stress buffer portions (30a, 30b) decreases, making it difficult to secure molding accuracy. Accordingly, the number of the stress buffer portions (30a, 30b) is determined as appropriate in consideration of dimension accuracy in manufacturing the sealing gasket 20 and other factors. Moreover, as illustrated in Table 1, since the configuration in which the number of stress buffer portions (30a, 30b) is two that is the minimum required number can secure satisfactory explosion-proof safety performance while allowing an increase in the capacity of the power generation element housing region, it is more preferable that the number of the stress buffer portions (30a, 30b) be two.

The sealing gasket 20 according to the aforementioned embodiment is not limited to the alkaline battery 1 but can be applied to various tubular batteries in which a sealing plate is fitted and attached to the open end of the battery can 2 by subjecting the open end of the battery can 2 to the diameter reduction processing.

The present disclosure provides a sealing gasket that reliably absorbs stress generated when an opening portion of a battery can of a tubular battery is sealed by crimping and that also allows an increase in the volume of a power generation element packed in the battery can, and a tubular battery including the sealing gasket.

The above-described embodiments are intended to facilitate an understanding of the present disclosure and are not in any way to be construed as limiting the present disclosure. The present disclosure may be modified and improved without departing from the scope of the disclosure, and equivalents thereof are also encompassed by the disclosure.

What is claimed is:

1. A sealing gasket for a tubular battery, the sealing gasket comprising:
   a disc-shaped partition portion;
   an outer peripheral portion provided to stand from a peripheral edge of the partition portion and held between an open end of a metal battery can and a dish-shaped metal sealing plate; and
   a plurality of stress buffer portions formed of annular grooves formed concentrically in the partition portion,
   the tubular battery including
      the metal battery can having a bottomed tubular shape and has the open end subjected to inward diameter reduction,
      a power generation element housed in the metal battery can,
      the dish-shaped metal sealing plate fitted and attached to the open end subjected to the inward diameter reduction, and
      the sealing gasket, made of resin and held between the open end and the sealing plate,
   wherein Ha/H, a ratio of a thickness Ha of a region of the partition portion in which the plurality of stress buffer portions are formed to an overall height H from a lowest position to a highest position of the sealing gasket, is 15% or more and 30% or less,
   the plurality of stress buffer portions are offset from each other and formed alternately on opposite surfaces of the partition portion,
   the annular grooves that form the stress buffer portions are formed within the thickness Ha of the partition portion,
   a depth of the annular grooves that form the plurality of stress buffer portions is determined by the thickness Ha and is the same for all the stress buffer portions, and
   a thickness of bottoms of the annular grooves that form the plurality of stress buffer portions is the same for all the stress buffer portions.

2. The sealing gasket according to claim 1, wherein the number of the stress buffer portions is two.

3. A tubular battery comprising:
   a metal battery can having a bottomed tubular shape and an open end subjected to inward diameter reduction;
   a power generation element housed in the metal battery can;
   a dish-shaped metal sealing plate fitted and attached to the open end subjected to the inward diameter reduction; and
   a sealing gasket made of resin and held between the open end and the sealing plate,
   the sealing gasket including
      a disc-shaped partition portion,
      an outer peripheral portion provided to stand from a peripheral edge of the partition portion and held between the open end and the sealing plate, and
      a plurality of stress buffer portions formed of annular grooves formed concentrically in the partition portion,
   wherein Ha/H, a ratio of a thickness Ha of a region of the partition portion in which the plurality of stress buffer portions are formed to an overall height H from a lowest position to a highest position of the sealing gasket, is 15% or more and 30% or less,
   the plurality of stress buffer portions are offset from each other and formed alternately on opposite surfaces of the partition portion,
   the annular grooves that form the stress buffer portions are formed within the thickness Ha of the partition portion,
   a depth of the annular grooves that form the plurality of stress buffer portions is determined by the thickness Ha and is the same for all the stress buffer portions, and
   a thickness of bottoms of the annular grooves that form the plurality of stress buffer portions is the same for all the stress buffer portions.

* * * * *